United States Patent
Hsiao

(10) Patent No.: US 12,175,757 B2
(45) Date of Patent: Dec. 24, 2024

(54) METHODS FOR ACTION LOCALIZATION, ELECTRONIC DEVICE AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Jenhao Hsiao, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 193 days.

(21) Appl. No.: 17/951,971

(22) Filed: Sep. 23, 2022

(65) Prior Publication Data

US 2023/0033011 A1    Feb. 2, 2023

Related U.S. Application Data

(63) Continuation of application No. PCT/CN2021/085787, filed on Apr. 7, 2021.

(51) Int. Cl.
*G06N 3/045* (2023.01)
*G06N 3/048* (2023.01)
(Continued)

(52) U.S. Cl.
CPC ............ *G06V 20/49* (2022.01); *G06V 10/454* (2022.01); *G06V 10/82* (2022.01); *G06V 20/41* (2022.01); *G06V 20/44* (2022.01)

(58) Field of Classification Search
CPC ........ G06N 3/045; G06N 3/048; G06N 3/088; G06V 10/454; G06V 10/82; G06V 20/41;
(Continued)

(56) References Cited

U.S. PATENT DOCUMENTS

2002/0054074 A1* 5/2002 Sugano ............... G06F 16/745
                                                                                    715/730
2020/0143204 A1* 5/2020 Nakano ............... G06V 10/82

FOREIGN PATENT DOCUMENTS

| CN | 109446923 A | 3/2019 |
| WO | 2018124309 A1 | 7/2018 |
| WO | 2018171109 A1 | 9/2018 |

OTHER PUBLICATIONS

International Search Report and Written Opinion for PCT Application PCT/CN2021/085787 mailed Jul. 7, 2021. (9 pages).

(Continued)

*Primary Examiner* — Daquan Zhao
(74) *Attorney, Agent, or Firm* — Young Basile Hanlon & MacFarlane, P.C.

(57) ABSTRACT

A method for action localization is disclosed. The method includes dividing a video comprising a first number of frames into a second number of clips, each of the clips comprising at least one of the frames; processing the clips to obtain a first clip descriptor for the each of the clips and feature maps for each of the frames; obtaining a representation of the video based on the first clip descriptor for the each of the clips; predicting an action classification of the video based on the representation of the video; calculating an importance weight for each of the feature maps based on a gradient of the action classification; and obtaining a localization map for the each of the frames based on importance weights of corresponding feature maps.

18 Claims, 5 Drawing Sheets

(51) Int. Cl.
    *G06N 3/088*     (2023.01)
    *G06V 10/44*     (2022.01)
    *G06V 10/82*     (2022.01)
    *G06V 20/40*     (2022.01)
    *G06V 20/70*     (2022.01)

(58) Field of Classification Search
    CPC ........ G06V 20/44; G06V 20/49; G06V 20/00;
                                G06V 20/46; G06V 20/70
    USPC ................ 386/278, 282, 280, 239, 248, 241
    See application file for complete search history.

(56)           References Cited

OTHER PUBLICATIONS

Qingwei Qiao, "Human Action Recognition via Dual Spatio-temporal Network Flow and Attention Mechanism Fusion", Nanjing University of Posts and Telecommunications, China's Master's Theses Full-text Database, May 2017. (207 pages).
Kevin Lin et al.,"Deep Learning of Binary Hash Codes for Fast Image Retrieval", IEEE Conference on Computer Vision and Pattern Recognition Workshops, Oct. 26, 2015, (27-35 pages).

* cited by examiner

METHODS FOR ACTION LOCALIZATION, ELECTRONIC DEVICE AND NON-TRANSITORY COMPUTER-READABLE STORAGE MEDIUM

CROSS-REFERENCE TO RELATED APPLICATION(S)

The present disclosure is a continuation of International (PCT) Patent Application No. PCT/CN2021/085787 filed on Apr. 7, 2021, which claims priority to U.S. Provisional Application No. 63/006,993, filed on Apr. 8, 2020, the entire contents of both of which are herein incorporated by reference.

TECHNICAL FIELD

The present disclosure generally relates to the technical field of video processing, and in particular relates to a method for action localization, an electronic device and a non-transitory computer-readable storage medium.

BACKGROUND

Existing action/moment recognition and localization approaches heavily rely on strong supervision, in the form of training videos, that have been manually collected, labeled and annotated. These approaches learn to detect an action using manually annotated bounding boxes and recognize using action class labels from training data. However, collecting large amounts of accurately annotated action videos is very expensive for developing a supervised action localization approach, considering the growth of video datasets with large number of action classes.

SUMMARY

According to a first aspect of the present disclosure, a method for action localization is provided. The method includes dividing a video including a first number of frames into a second number of clips, each of the clips including at least one of the frames; processing the clips to obtain a first clip descriptor for the each of the clips and feature maps for each of the frames; obtaining a representation of the video based on the first clip descriptor for the each of the clips; predicting an action classification of the video based on the representation of the video; calculating an importance weight for each of the feature maps based on a gradient of the action classification; and obtaining a localization map for the each of the frames based on importance weights of corresponding feature maps.

According to a second aspect of the present disclosure, an electronic device is provided. The electronic device includes a processor and a memory storing instructions. When the instructions are executed by the processor, causes the processor to perform the method as described in the first aspect.

According to a third aspect of the present disclosure, a non-transitory computer-readable storage medium is provided. The non-transitory computer-readable storage medium stores instructions. When the instructions are executed by a processor, causes the processor to perform the method as described in the first aspect.

BRIEF DESCRIPTION OF DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
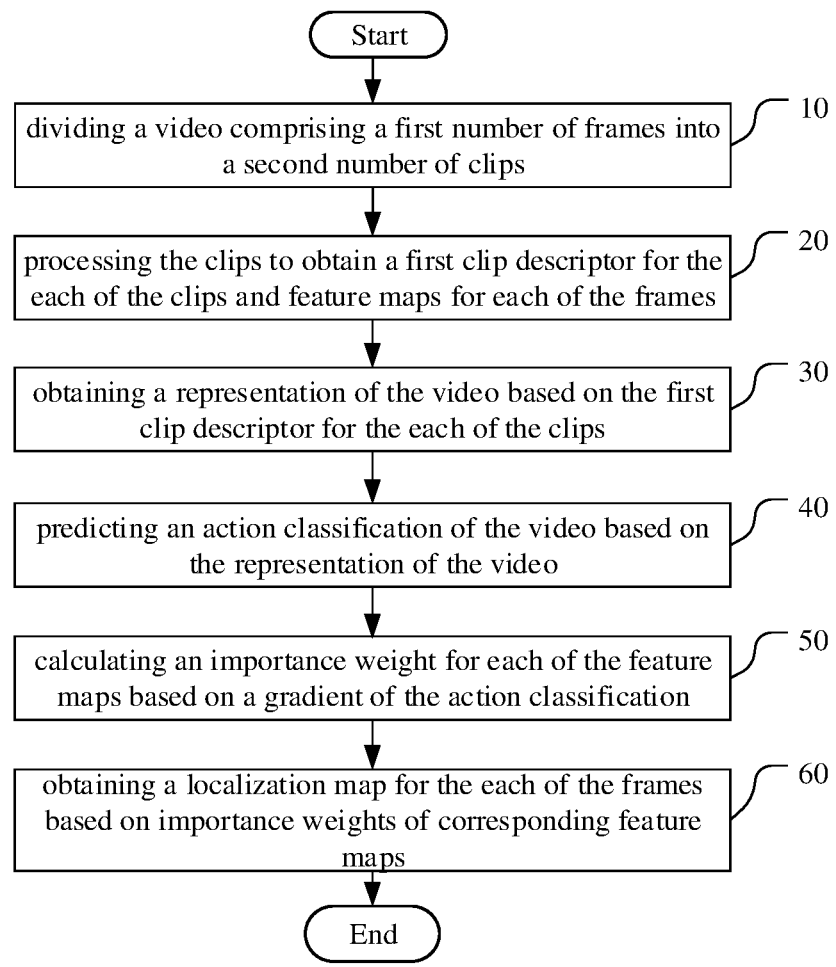
FIG. 1 is a flow chart of a method for action localization according to some embodiments of the present disclosure.

To make any one of skill in the art to understand the technical solutions of the present disclosure, the methods for action localization, device and non-transitory computer-readable storage medium provided by the present disclosure will be described in details by referring to the drawings and the embodiments. The ones in the following embodiments that do not conflict with each other may be combined with each other.

FIG. 1 is flow chart of a method for action localization according to some embodiments of the present disclosure. The method may be performed by an electronic device, which includes, but is not limited to, a computer, a server, etc. The method includes actions/operations in the following blocks.

At block 10, the method may include dividing a video including a first number of frames into a second number of clips.

Hereinafter the first number can be referred to as B, and the second number can be referred to as C. Each of the clips comprises at least one of the frames. A clip may also be referred to as a segment or a video segment. The frames in each clip can be stacked, that is the indexes of frames in each clip are continuous. For ease of description, we assume that each clip comprises T frames, while the number of frames in different clips may be different in actual application. Height of each frame is H and Width of each frame is W. The video/clips may be denoted as $X = \{x_1, x_2, \ldots, x_C\}$.

Figure 2:
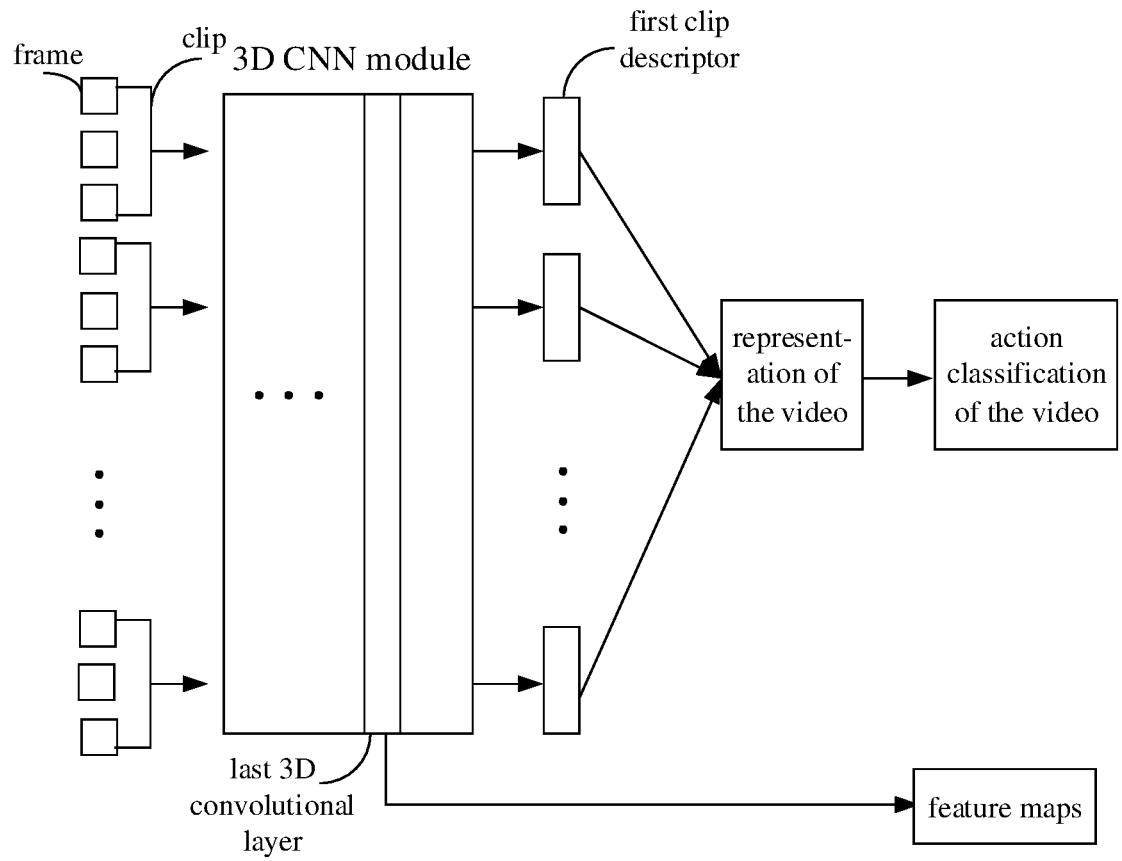
FIG. 2 is a diagram of a framework of the end-to-end deep neural network according to some embodiments of the present disclosure.

Then the video/clips can be processed by an end-to-end deep neural network (hereinafter referred to as network). The input shape of the network for one batch data can be $C \times T \times H \times W \times ch$, wherein ch denotes the channel number and can be 3 for RGB images. FIG. 2 is a diagram of a framework of the end-to-end deep neural network according to some embodiments of the present disclosure. The processing of the network is described in blocks 20~40.

At block 20, the method may include processing the clips to obtain a first clip descriptor for the each of the clips and feature maps for each of the frames.

The clips can be processed by a 3D Convolutional Neural Network (CNN) module, the 3D CNN module comprising a set of 3D convolutional layers. Each of the 3D convolutional layers comprises at least one convolutional kernel. The convolutional kernel for each 3D convolutional layer in 3D CNN can be in 3 dimensions. Then for each 3D convolutional layer, data will be computed among three dimensions simultaneously. To maintain the temporal accuracy of action localization, no strides will be applied along the T dimension during the 3D convolution.

Each of the feature maps is an output of one of the at least one convolutional kernel of the last 3D convolutional layer for a corresponding frame. The last 3D convolutional layer comprises ch' convolutional kernels (convolutional filters), and the output of each convolutional kernel for each frame is a feature map. The output of k-th convolution kernel of the last 3D convolutional layer for t-th frame can be denoted as feature $A^{t,k}$.

Feature maps can be an intermediate product of the 3D CNN module. The output of the 3D CNN module is a set of first clip descriptors $V=\{v_1, v_2, \ldots, v_C\}$. Feature maps corresponding to clip $x_i$ (i.e. output of all convolution kernels of the last 3D convolutional layer for frames belonging to the clip $x_i$) can be processed by subsequent layer(s) such as fully connected layer(s) to obtain $v_i$, i=1, 2, ..., C.

At block 30, the method may include obtaining a representation of the video based on the first clip descriptor for the each of the clips.

The representation of the video may be an average of the first clip descriptors.

Figure 3:
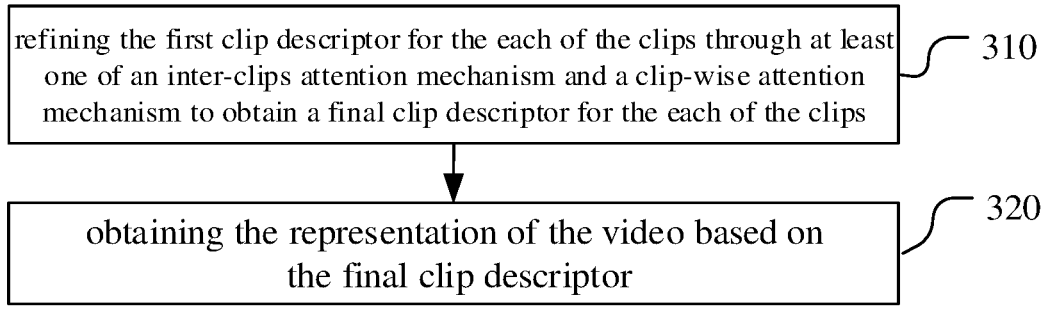
FIG. 3 is a detailed flow chart of block 30 in FIG. 1.

Referring to FIG. 3, in some embodiments, the block 30 may comprises following subblocks.

At subblock 310, the method may include refining the first clip descriptor for the each of the clips through at least one of an inter-clips attention mechanism and a clip-wise attention mechanism to obtain a final clip descriptor for the each of the clips.

To achieve a better action recognition accuracy, the attention mechanism may be applied to refining the first clip descriptors. The attention mechanism may comprise the inter-clips attention mechanism and/or the clip-wise attention mechanism, which will be detailed described.

Inter-clips Attention Mechanism

Since each first clip descriptor is produced by the 3D CNN module separately, the inter-clips relationships modelled by convolution are inherently implicit and local. That is, each first clip descriptor can only observe an extremely limited local event and there are no inter-clips relationships. This will become a performance bottleneck since the duration of different actions are variant and complex actions which could across multiple video segments (i.e., multiple clips can be involved).

To capture the inter-clips dependencies for both short- and long-range dependencies, we propose the inter-clips attention mechanism that aims at strengthening the clip descriptors of the query position via aggregating information from other positions (e.g., other video segments).

Figure 4:
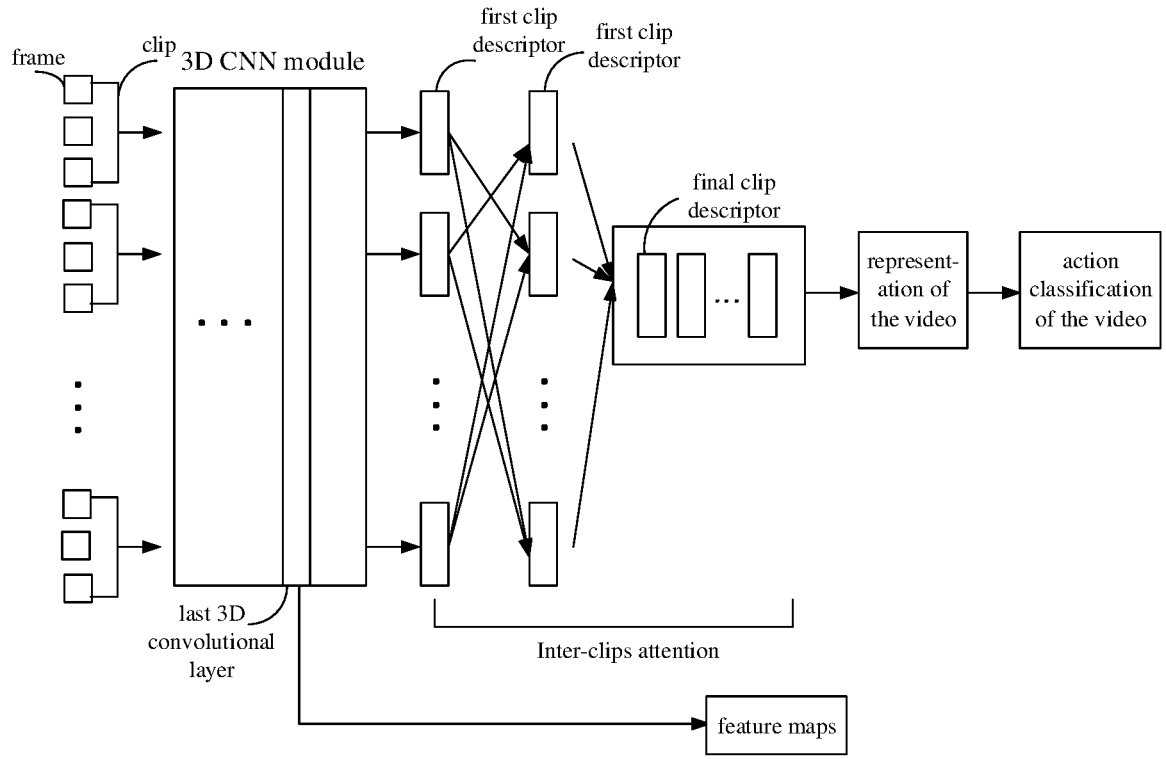
FIG. 4 is a diagram of a framework of the end-to-end deep neural network adopting the inter-clips attention mechanism according to some embodiments of the present disclosure.

FIG. 4 is a diagram of a framework of the end-to-end deep neural network adopting the inter-clips attention mechanism according to some embodiments of the present disclosure.

The inter-clips attention can adopt a bi-directional attention to link different clips. Each of the final clip descriptor can be calculated based on the first clip descriptors through the bi-directional attention mechanism. Specifically, the final clip descriptor for the each of the clips is indicated by a relationship between a corresponding first clip descriptor for a corresponding one of the clips and first clip descriptors for all other clips.

The final clip descriptor can be expressed as:

$$f_i = BA(v_i) = W_Z \sum_j \frac{(W_q v_i)(W_k v_j)^*}{N(v)} (W_v v_j) \quad (1)$$

In formula (1), i is the index of the clip (query position), i=1, 2, ..., C, and j enumerates all possible other clips. $W_q$, $W_k$, $W_v$ and $W_z$ denote linear transform matrices. $(W_q v_i)(W_k v_j)$ denotes the relationship between clip i and j, and N(v) is a normalization factor. The advantage of the above dot-product attention is that it is much faster and more space-efficient in practice, since it can be implemented using highly optimized matrix multiplication code. $BA(v_i)$ can also be referred to as a bi-directional clip descriptor.

Clip-wise Attention Mechanism

An action typically represents only a subset of objects and events which are most relevant to the context of the video. To suppress irrelevant clips, we further introduce the clip-wise attention to re-weight the first clip descriptors and remove less related clips to join the final action recognition decision.

Figure 5:
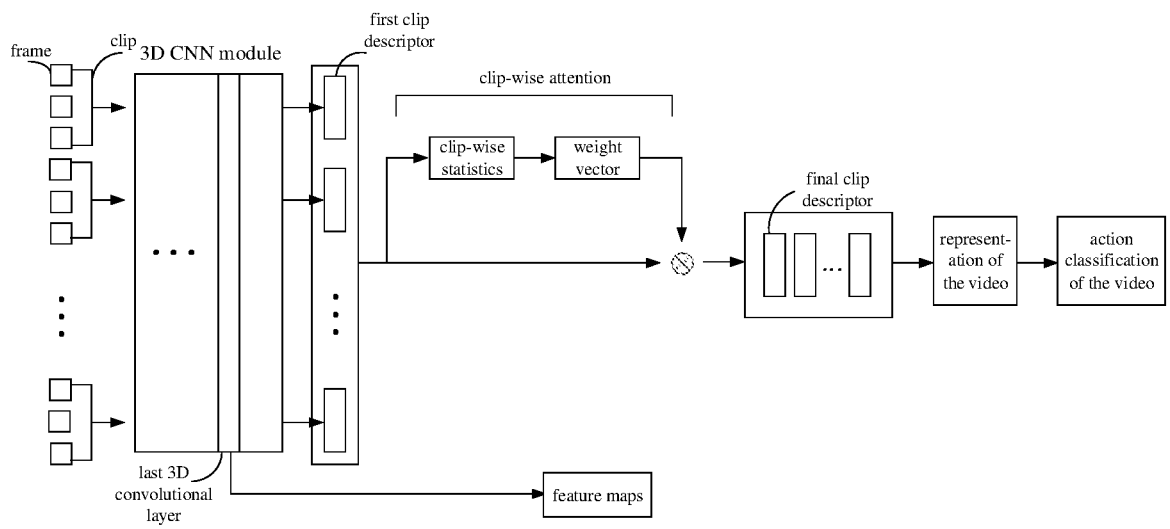
FIG. 5 is a diagram of a framework of the end-to-end deep neural network adopting the clip-wise attention mechanism according to some embodiments of the present disclosure.

FIG. 5 is a diagram of a framework of the end-to-end deep neural network adopting the clip-wise attention mechanism according to some embodiments of the present disclosure.

First, we first generate clip-wise statistics for the first clip descriptors by global average pooling.

$$g=[\text{mean}(v_1), \text{mean}(v_2), \text{mean}(v_c)] \quad (2)$$

The pooled output can be interpreted as a collection of local descriptors whose statistics are expressive for a whole clip.

Then we follow it with a second operation which aims to fully capture clip-wise dependencies. Here we opt to obtain a weight vector through applying a gating mechanism with a sigmoid activation to the clip-wise statistics. The weight vector can be expressed as:

$$\text{att}=\sigma_{sigmoid}(W_2 \sigma_{RELU}(W_1 g)) \quad (3)$$

In formula (3), $\sigma_{RELU}$ refers to the ReLU function, $W_1$ and $W_2$ are the fully connected layer weights, and $\sigma_{sigmoid}$ is a sigmoid function. The weight vector att is defined in a clip-agnostic way, which is useful to identify segments/clips relevant to action of an interest and estimate temporal intervals of detected actions.

We can obtain the final clip descriptor for the each of the clips through rescaling the first clip descriptor for the each of the clips with the weight vector att. The final clip descriptors can be expressed as:

$$f_i=\text{att}_i \times v_i \quad (4)$$

The weight vector att transformation intrinsically introduces dynamics conditioned on the input (i.e., the first clip descriptors), which can be regarded as a gated function on clips that re-weights the clips based on their significances to an action event.

Dual Attention Mechanism

We introduce a Dual Attention mechanism that explicitly models the inter-dependencies between video clips and captures the clip-wise importance to increase the deep network's sensitivity to informative features across video segments, which turn out to deliver a better prediction decision due to the use of a more comprehensive video feature.

Figure 6:
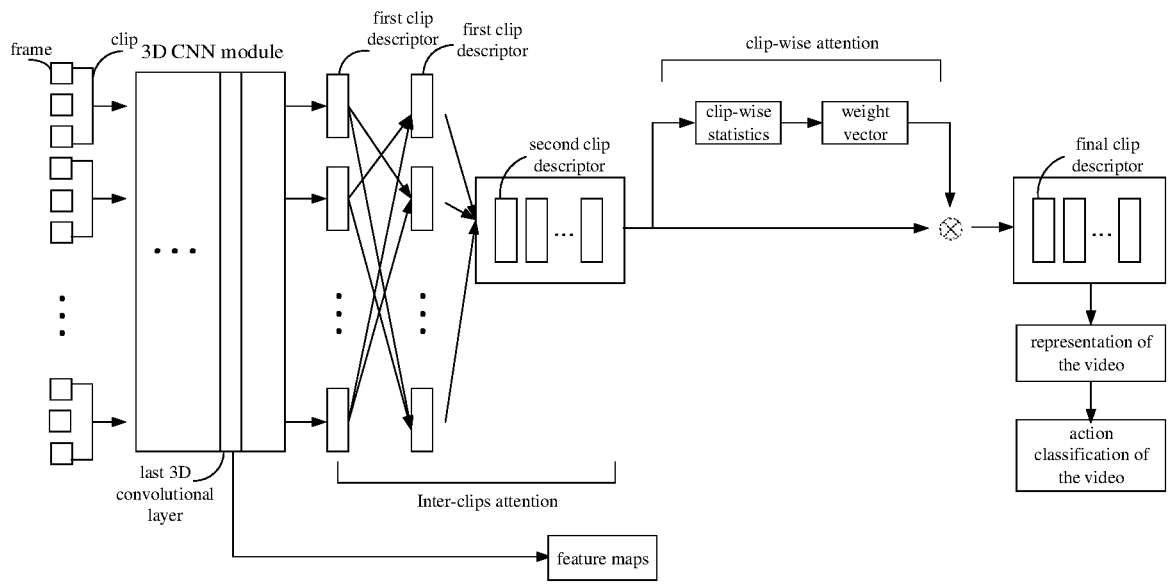
FIG. 6 is a diagram of a framework of the end-to-end deep neural network adopting the inter-clips attention mechanism and clip-wise attention mechanism according to some embodiments of the present disclosure.

FIG. 6 is a diagram of a framework of the end-to-end deep neural network adopting the inter-clips attention mechanism and clip-wise attention mechanism according to some embodiments of the present disclosure.

Specifically, we can calculate a second clip descriptor for the each of the clips based on the first clip descriptor for the each of the clips through a bi-directional attention mechanism. The second clip descriptor can be expressed as:

$$s_i = BA(v_i) = W_Z \sum_j \frac{(W_q v_i)(W_k v_j)^*}{N(v)} (W_v v_j) \qquad (5)$$

In formula (5), i is the index of the clip (query position), i=1,2,...,C, and j enumerates all possible other clips. $W_q$, $W_k$, $W_v$ and $W_z$ denote linear transform matrices. $(W_q v_i)(W_k v_j)$ denotes the relationship between clip i and j, and N(v) is the normalization factor. The advantage of the above dot-product attention is that it is much faster and more space-efficient in practice, since it can be implemented using highly optimized matrix multiplication code.

Then we can generate clip-wise statistics for the second clip descriptor for the each of the clips by global average pooling.

$$g'=[mean(s_1), mean(s_2), mean(s_c)] \qquad (6)$$

The pooled output can be interpreted as a collection of the local descriptors whose statistics are expressive for the whole clip.

Then we can obtain a weight vector through applying a gating mechanism with a sigmoid activation to the clip-wise statistics. The weight vector can be expressed as:

$$att'=\sigma_{sigmoid}(W_2 \sigma_{RELU}(W_1 g')) \qquad (7)$$

In formula (7), $\sigma_{RELU}$ refers to the ReLU function, $W_1$ and $W_2$ are the fully connected layer weights, and $\sigma_{sigmoid}$ is the sigmoid function. The weight vector att' is defined in a clip-agnostic way, which is useful to identify segments/clips relevant to the action of the interest and estimate the temporal intervals of the detected actions.

We can obtain the final clip descriptor for the each of the clips through rescaling the second clip descriptor for the each of the clips with the weight vector. The final clip descriptors can be expressed as:

$$f_i=att'_i \times s_i \qquad (8)$$

The weight vector att' transformation intrinsically introduces the dynamics conditioned on the input (i.e., the second clip descriptors), which can be regarded as the gated function on the clips that re-weights the clips based on their significances to the action event.

At subblock 320, the method may include obtaining the representation of the video based on the final clip descriptor.

The representation of the video may be an average of the final clip descriptors. The representation of the video can be expressed as:

$$v' = \frac{1}{C} \sum_i f_i \qquad (9)$$

At block 40, the method may include predicting an action classification of the video based on the representation of the video.

The action classification predicted based on the representation of the video v' can be expressed as:

$$Y=\sigma_{softmax}(W_3 V') \qquad (10)$$

In formula (10), $W_3$ is the fully connected layer weights, and $\sigma_{softmax}$ is a softmax function.

During the training of the network, multiple training videos with action class labels can be processed by the network to obtain the action classification for each training video. Then we can calculate a loss function based on the action classification and the weight vector if the network adopts the clip-wise attention mechanism.

The loss function may comprise a classification loss and a sparsity loss. Specifically, the classification loss can be indicated by a standard cross-entropy loss between a ground truth (an action class label) and the action classification, and the sparsity loss is indicated by a L1norm on the weight vector. The classification loss can be expressed as:

$$L=L_c+\beta L_s \qquad (11)$$

In formula (11), $L_c$ denotes the classification loss, $L_s$ is the sparsity loss on the weight vector, and β is a constant to control the trade-off between the two terms. The classification loss is based on the standard cross-entropy loss between the ground truth and the action classification y, while the sparsity loss is given by the L1 norm on the weight vector.

Because of the use of the sigmoid function and the sparsity loss $L_s$, all the elements in the weight vector tend to have values close to either 0 or 1. In this case, an action can be recognized with a sparse subset of key segments in a video, which will help locating relevant clips for an action detection.

At block 50, the method may include calculates an importance weight for each of the feature maps based on a gradient of the action classification.

The importance weight can be indicated by a global average-pooling result of the gradient of the action classification with respect to a corresponding feature map.

In order to obtain a discriminative localization map $M_t \in R^{uw}$ of a width u and a height w at a frame t, we first compute the gradient of the predicted action classification m, $y_m$, with respect to feature map $A^{t,k}$. These gradients flowing back are global average-pooled to obtain the importance weight. The importance weight can be expressed as:

$$\alpha_{t,k}^m = \frac{1}{Z} \sum_i \sum_j \frac{\partial y^m}{\partial A_{ij}^{t,k}} \qquad (12)$$

In formula (12), Z is the normalization factor (i.e., a size of the feature map), and $A_{ij}^{t,k}$ is a pixel (i,j) in the feature map $A^{t,k}$. The weight $a_{t,k}^m$ represents a partial linearization of a deep network downstream from $A^{t,k}$, and captures the 'importance' of the feature map $A^{t,k}$ for a target action m.

At block 60, the method may include obtaining a localization map for the each of the frames based on importance weights of corresponding feature maps.

We can obtain a heat map by applying a Rectified Linear Unit (ReLU) to a linear combination of the corresponding feature maps with the importance weights of the corresponding feature maps. The heat map for frame t can be expressed as:

$$M_t=ReLU(\Sigma_k a_{t,k}^m A_k A^{t,k}) \qquad (13)$$

We can apply the ReLU to the linear combination of the feature maps because we are only interested in the features that have positive influences on the class of the interest, i.e., pixels whose intensities should be increased in order to increase $y_m$. Negative pixels are likely to belong to other categories in the image.

A size of the heat map is the same as the feature map, and we can obtain the localization map by resizing the heat map to match a size of the each of the frames.

In the present embodiments, the action recognition is performed by evaluating a video-level representation given by a carefully designed network architecture, and thus the network can be trained using weakly supervised data (the video with the action class labels). No spatial nor temporal annotations of actions in training data are needed.

An enhanced prediction then unsupervisedly back-propagates to generate localization maps that localizes actions in videos. The localization maps can automatically discover an action's location at a finest spatio-temporal level. The a spatio-temporal action location is also key information to many real-world applications, such as a video moment search.

To prove effectiveness of this invention, Table 1 shows an Accuracy comparison of different methods in Kinetics-600, which consists of 600 action classes and contains around 20 k videos for a validation. As can be seen that in a traditional method, which assume that a central clip is the most related event and directly use it as the input, can achieve the poorest 58.58% top-1 accuracy. The poor accuracy is mainly due to the lack of fully utilizing the information in the video (e.g., the rest relevant clips). Naïve average of clips is another popular method, but it can only achieve 65.3% top-1 accuracy. Since an action is usually complex and across video segments, uniformly average all clips is obviously not the best strategy and can only achieve limited accuracy.

All the proposed attention mechanism can achieve better accuracy than the traditional method. For the inter-clips attention only network, it has 68.71% top-1 accuracy, while the clip-wise attention only network can achieve 67.46%. It proves that the proposed attention mechanism builds a better clip/video feature representation that captures short-and long-range statistics. The Dual Attention, which combine the advantages from both inter-clips and clip-wise attention, can achieve the best accuracy of 70.07%, which shows the effectiveness of this invention.

TABLE 1

| Method | Top-1 Accuracy (%) |
| --- | --- |
| 3D ResNet-101 + Central clip | 58.58 |
| 3D ResNet-101 + 10 clips average | 65.30 |
| Our method: Inter-Clips Attention Only | 68.71 |
| Our method: Clip-Wise Attention Only | 67.46 |
| Our method: Dual Attention | 70.07 |

Figure 7:
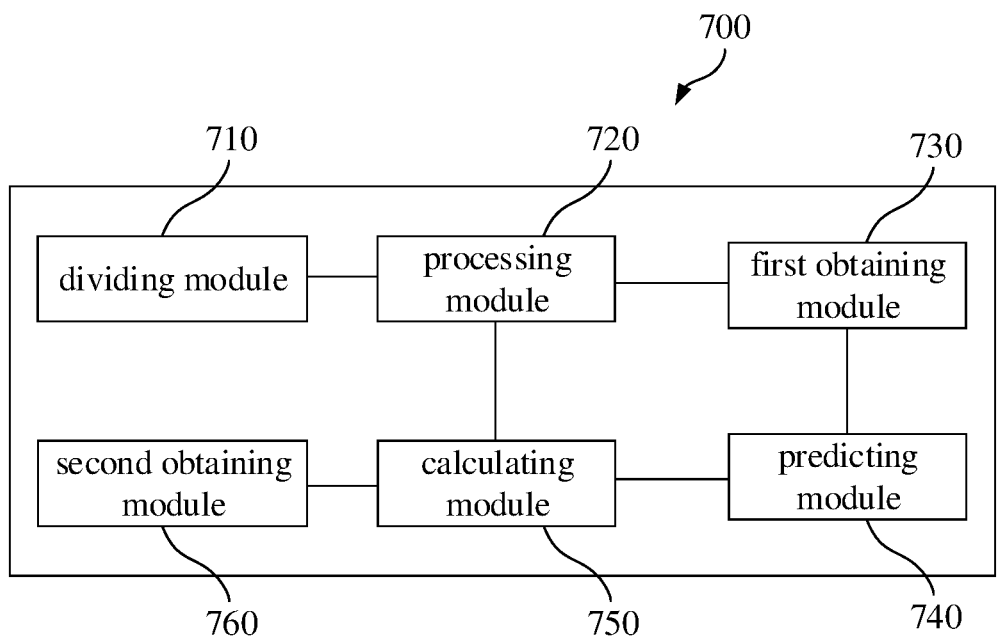
FIG. 7 is a structural schematic view of an apparatus for action localization according to some embodiments of the present disclosure.

FIG. 7 is a structural schematic view of an apparatus for action localization according to some embodiments of the present disclosure. The apparatus 700 may include a dividing module 710, a processing module 720, a first obtaining module 730, a predicting module 740, a calculating module 750, and a second obtaining module 770.

The dividing module 710 may be configured to divide a video comprising a first number of frames into a second number of clips, each of the clips comprising at least one of the frames. The processing module 720 may be configured to process the clips to obtain a first clip descriptor for the each of the clips and feature maps for each of the frames.

The first obtaining module 730 may be configured to obtain a representation of the video based on the first clip descriptor for the each of the clips. The predicting module 740 may be configured to predict an action classification of the video based on the representation of the video. The calculating module 750 may be configured to calculate an importance weight for each of the feature maps based on a gradient of the action classification. The second obtaining module 760 may be configured to obtain a localization map for the each of the frames based on importance weights of corresponding feature maps.

It should be noted that, the above descriptions for the methods for action localization in the above embodiments, are also appropriate for the apparatus of the exemplary embodiments of the present disclosure, which will be not described herein.

Figure 8:
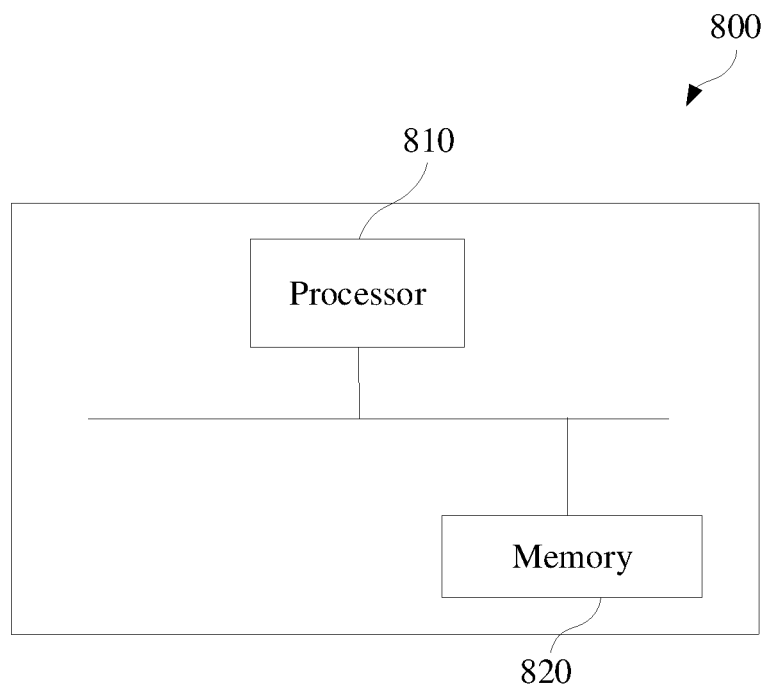
FIG. 8 is a structural schematic view of an electronic device according to some embodiments of the present disclosure.

FIG. 8 is a structural schematic view of an electronic device according to some embodiments of the present disclosure. The electronic device 800 may include a processor 810 and a memory 820, which are coupled together.

The memory 820 is configured to store executable program instructions. The processor 810 may be configured to read the executable program instructions stored in the memory 820 to implement a procedure corresponding to the executable program instructions, so as to perform any method for action localization as described in the previous embodiments or a method provided arbitrarily and non-conflicting combination of the previous embodiments.

The electronic device 800 may be a computer, a sever, etc. in one example. The electronic device 800 may be a separate component integrated in a computer or a sever in another example.

A non-transitory computer-readable storage medium is provided, which may be in the memory 820. The non-transitory computer-readable storage medium stores instructions, when executed by a processor, causing the processor to perform the method as described in the previous embodiments.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of software product. The computer software product is stored in a storage medium, for example, non-transitory computer-readable storage medium, and includes several instructions for instructing a computer device (which may be a personal computer, a server, or a network device) to perform all or a part of the steps of the methods described in the embodiments of the present disclosure. The foregoing storage medium includes any medium that can store program codes, such as a USB flash disk, a removable hard disk, a read-only memory (ROM), a random access memory (RAM), a magnetic disk, or an optical disk.

The foregoing descriptions are merely specific embodiments of the present disclosure, but are not intended to limit the protection scope of the present disclosure. Any equivalent modification or replacement figured out by a person skilled in the art within the technical scope of the present disclosure shall fall within the protection scope of the present disclosure. Therefore, the protection scope of the present disclosure shall be subject to the protection scope of the claims.

What is claimed is:

1. A method for action localization, comprising:
    dividing a video comprising a first number of frames into a second number of clips, each of the clips comprising at least one of the frames;
    processing the clips to obtain a first clip descriptor for the each of the clips and feature maps for each of the frames;
    obtaining a representation of the video based on the first clip descriptor for the each of the clips;
    predicting an action classification of the video based on the representation of the video;
    calculating an importance weight for each of the feature maps based on a gradient of the action classification; and
    obtaining a localization map for the each of the frames based on importance weights of corresponding feature maps;
    wherein the obtaining the representation of the video based on the first clip descriptor for the each of the clips comprises:
    refining the first clip descriptor for the each of the clips through at least one of an inter-clips attention mechanism and a clip-wise attention mechanism to obtain a final clip descriptor for the each of the clips; and
    obtaining the representation of the video based on the final clip descriptor.

2. The method of claim 1, wherein the processing the clips to obtain the first clip descriptor for the each of the clips and the feature maps for each of the frames comprises:
    processing the clips by a 3D Convolutional Neural Network (CNN) module, the 3D CNN module comprising a set of 3D convolutional layers, wherein last one of the 3D convolutional layers comprises at least one convolutional kernel, and each of the feature maps is an output of one of the at least one convolutional kernel for a corresponding frame.

3. The method of claim 1, wherein the refining the first clip descriptor for the each of the clips through the inter-clips attention mechanism to obtain the final clip descriptor comprises:
    calculating the final clip descriptor for the each of the clips based on the first clip descriptor for the each of the clips through a bi-directional attention mechanism.

4. The method of claim 3, wherein the final clip descriptor for the each of the clips is indicated by a relationship between a corresponding first clip descriptor for a corresponding one of the clips and first clip descriptors for all other clips.

5. The method of claim 1, wherein the refining the first clip descriptor for the each of the clips through the clip-wise attention mechanism to obtain the final clip descriptor for the each of the clips comprises:
    generating clip-wise statistics for the first clip descriptor for the each of the clips by global average pooling;
    obtaining a weight vector through applying a gating mechanism with a sigmoid activation to the clip-wise statistics; and
    obtaining the final clip descriptor for the each of the clips through rescaling the first clip descriptor for the each of the clips with the weight vector.

6. The method of claim 5, further comprising:
    calculating a loss function based on the action classification and the weight vector.

7. The method of claim 6, wherein the loss function comprises a classification loss and a sparsity loss, the classification loss is indicated by a standard cross-entropy loss between a ground truth and the action classification, and the sparsity loss is indicated by a L1 norm on the weight vector.

8. The method of claim 1, wherein the refining the first clip descriptor for the each of the clips through the inter-clips attention mechanism and the clip-wise attention mechanism to obtain the final clip descriptor for the each of the clips comprises:
    calculating a second clip descriptor for the each of the clips based on the first clip descriptor for the each of the clips through a bi-directional attention mechanism;
    generating clip-wise statistics for the second clip descriptor for the each of the clips by global average pooling;
    obtaining a weight vector through applying a gating mechanism with a sigmoid activation to the clip-wise statistics; and obtaining the final clip descriptor for the each of the clips through rescaling the second clip descriptor for the each of the clips with the weight vector.

9. The method of claim 1, wherein the importance weight is indicated by a global average-pooling result of the gradient of the action classification with respect to a corresponding feature map.

10. The method of claim 1, wherein the obtaining the localization map for the each of the frames based on the importance weights of the corresponding feature maps comprises:
obtaining a heat map by applying a Rectified Linear Unit (ReLU) to a linear combination of the corresponding feature maps with the importance weights of the corresponding feature maps; and
obtaining the localization map by resizing the heat map to match a size of the each of the frames.

11. An electronic device, comprising:
a processor; and
a memory, storing instructions,
wherein when the instructions are executed by the processor, causing the processor to perform:
dividing a video comprising a first number of frames into a second number of clips, each of the clips comprising at least one of the frames;
processing the clips to obtain a first clip descriptor for the each of the clips and feature maps for each of the frames;
obtaining a representation of the video based on the first clip descriptor for the each of the clips;
predicting an action classification of the video based on the representation of the video;
calculating an importance weight for each of the feature maps based on a gradient of the action classification; and
obtaining a localization map for the each of the frames based on importance weights of corresponding feature maps;
wherein the obtaining the representation of the video based on the first clip descriptor for the each of the clips comprises:
refining the first clip descriptor for the each of the clips through at least one of an inter-clips attention mechanism and a clip-wise attention mechanism to obtain a final clip descriptor for the each of the clips; and
obtaining the representation of the video based on the final clip descriptor.

12. The electronic device of claim 11, wherein in the processing the clips to obtain the first clip descriptor for the each clip and the feature maps for each of the frames, the processor is caused to perform:
processing the clips by a 3D CNN module, the 3D CNN module comprising a set of 3D convolutional layers, wherein a last one of the 3D convolutional layers comprises at least one convolutional kernel, and each of the feature maps is an output of one of the at least one convolutional kernel for a corresponding frame.

13. The electronic device of claim 11, wherein in the refining the first clip descriptor for the each of the clips through the inter-clips attention mechanism to obtain the final clip descriptor, the processor is caused to perform:
calculating the final clip descriptor for the each of the clips based on the first clip descriptor for the each of the clips through a bi-directional attention mechanism.

14. The electronic device of claim 13, wherein the final clip descriptor for the each of the clips is indicated by a relationship between a corresponding first clip descriptor for a corresponding one of the clips and first clip descriptors for all other clips.

15. The electronic device of claim 11, wherein in the refining the first clip descriptor for the each of the clips through the clip-wise attention mechanism to obtain the final clip descriptor for the each of the clips, the processor is caused to perform:
generating clip-wise statistics for the first clip descriptor for the each of the clips by global average pooling;
obtaining a weight vector through applying a gating mechanism with a sigmoid activation to the clip-wise statistics; and
obtaining the final clip descriptor for the each of the clips through rescaling the first clip descriptor for the each of the clips with the weight vector.

16. The electronic device of claim 15, wherein the processor is further caused to perform:
calculating a loss function based on the action classification and the weight vector.

17. The electronic device of claim 11, wherein in the refining the first clip descriptor for the each of the clips through the inter-clips attention mechanism and the clip-wise attention mechanism to obtain the final clip descriptor for the each of the clips, the processor is caused to perform:
calculating second clip descriptor for the each of the clips based on the first clip descriptor for the each of the clips through a bi-directional attention mechanism;
generating clip-wise statistics for the second clip descriptor for the each of the clips by global average pooling;
obtaining a weight vector through applying a gating mechanism with a sigmoid activation to the clip-wise statistics; and
obtaining the final clip descriptor for the each of the clips through rescaling the second clip descriptor for the each of the clips with the weight vector.

18. A non-transitory computer-readable storage medium, storing instructions, wherein when the instructions are executed by a processor, causing the processor to perform:
dividing a video comprising a first number of frames into a second number of clips, each of the clips comprising at least one of the frames;
processing the clips to obtain a first clip descriptor for the each of the clips and feature maps for each of the frames;
obtaining a representation of the video based on the first clip descriptor for the each of the clips;
predicting an action classification of the video based on the representation of the video;
calculating an importance weight for each of the feature maps based on a gradient of the action classification; and
obtaining a localization map for the each of the frames based on importance weights of corresponding feature maps;
wherein the obtaining the representation of the video based on the first clip descriptor for the each of the clips comprises:
refining the first clip descriptor for the each of the clips through at least one of an inter-clips attention mechanism and a clip-wise attention mechanism to obtain a final clip descriptor for the each of the clips; and
obtaining the representation of the video based on the final clip descriptor.

* * * * *